(12) United States Patent
Fu et al.

(10) Patent No.: US 9,448,594 B2
(45) Date of Patent: Sep. 20, 2016

(54) ELECTRONIC DEVICE HAVING WATERPROOF STRUCTURE

(71) Applicant: ShenZhen Treasure City Technology Co., LTD., Shenzhen (CN)

(72) Inventors: Chin-Chung Fu, New Taipei (TW); Chih-Yuan Chang, New Taipei (TW); Chao-Guang Zhi, Shenzhen (CN); Yong-Xin Wang, Shenzhen (CN)

(73) Assignee: ShenZhen Treasure City Technology Co., LTD., ShenZhen (CN)

( * ) Notice: Subject to any disclaimer, the term of this patent is extended or adjusted under 35 U.S.C. 154(b) by 190 days.

(21) Appl. No.: 14/285,570

(22) Filed: May 22, 2014

(65) Prior Publication Data

US 2014/0347804 A1 Nov. 27, 2014

(30) Foreign Application Priority Data

May 24, 2013 (CN) .................. 2013 1 01954864

(51) Int. Cl.
*H05K 5/00* (2006.01)
*G06F 1/16* (2006.01)

(52) U.S. Cl.
CPC .................. *G06F 1/1656* (2013.01)

(58) Field of Classification Search
CPC .............. G06F 1/1656; G06F 1/1616; H04B 2001/3894; H05K 5/06; H01H 9/04
See application file for complete search history.

(56) References Cited

U.S. PATENT DOCUMENTS

| 5,844,772 A * | 12/1998 | Lee ..................... G06F 1/1626 361/679.26 |
| 9,042,095 B2 * | 5/2015 | Song ................... G06F 1/1626 361/679.21 |
| 2008/0081679 A1 * | 4/2008 | Kawasaki ............ H04B 1/3888 455/575.8 |
| 2011/0211300 A1 * | 9/2011 | Mori .................... G06F 1/1656 361/679.01 |
| 2012/0314354 A1 * | 12/2012 | Rayner ................. G06F 1/1656 361/679.01 |

* cited by examiner

*Primary Examiner* — Robert J Hoffberg
*Assistant Examiner* — Hung Dang
(74) *Attorney, Agent, or Firm* — Zhigang Ma (57) ABSTRACT

An electronic device includes an enclosure, a display module, a key part, and a water proof structure. The water proof structure seals a first gap between the display module and enclosure and a second gap between the display module and the key part and drains water which flows into the enclosure to the outside of the enclosure.

17 Claims, 9 Drawing Sheets

ELECTRONIC DEVICE HAVING WATERPROOF STRUCTURE

FIELD

The present disclosure relates to an electronic device having a waterproof structure.

BACKGROUND

In general, electronic devices, such as smart phones and pad computers, are not waterproof, therefore when liquid is spilt on such a device; it may be damaged by the liquid getting inside the device.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Reference will be made to the drawings to describe various embodiments.

Figure 1:
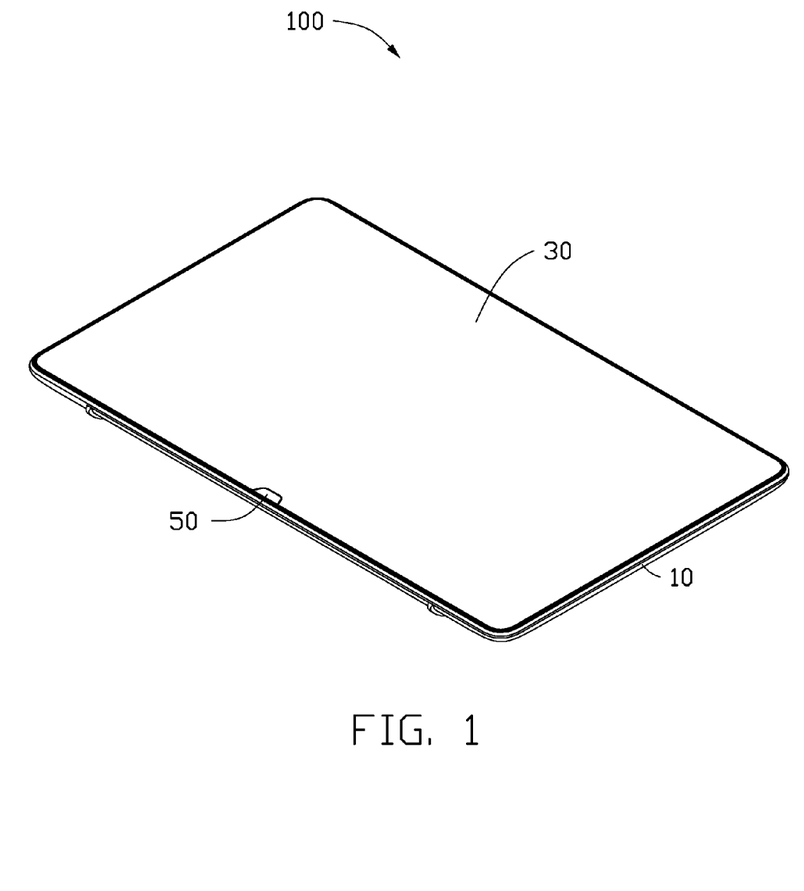
FIG. 1 is an isometric view of an embodiment of an electronic device.
Figure 2:
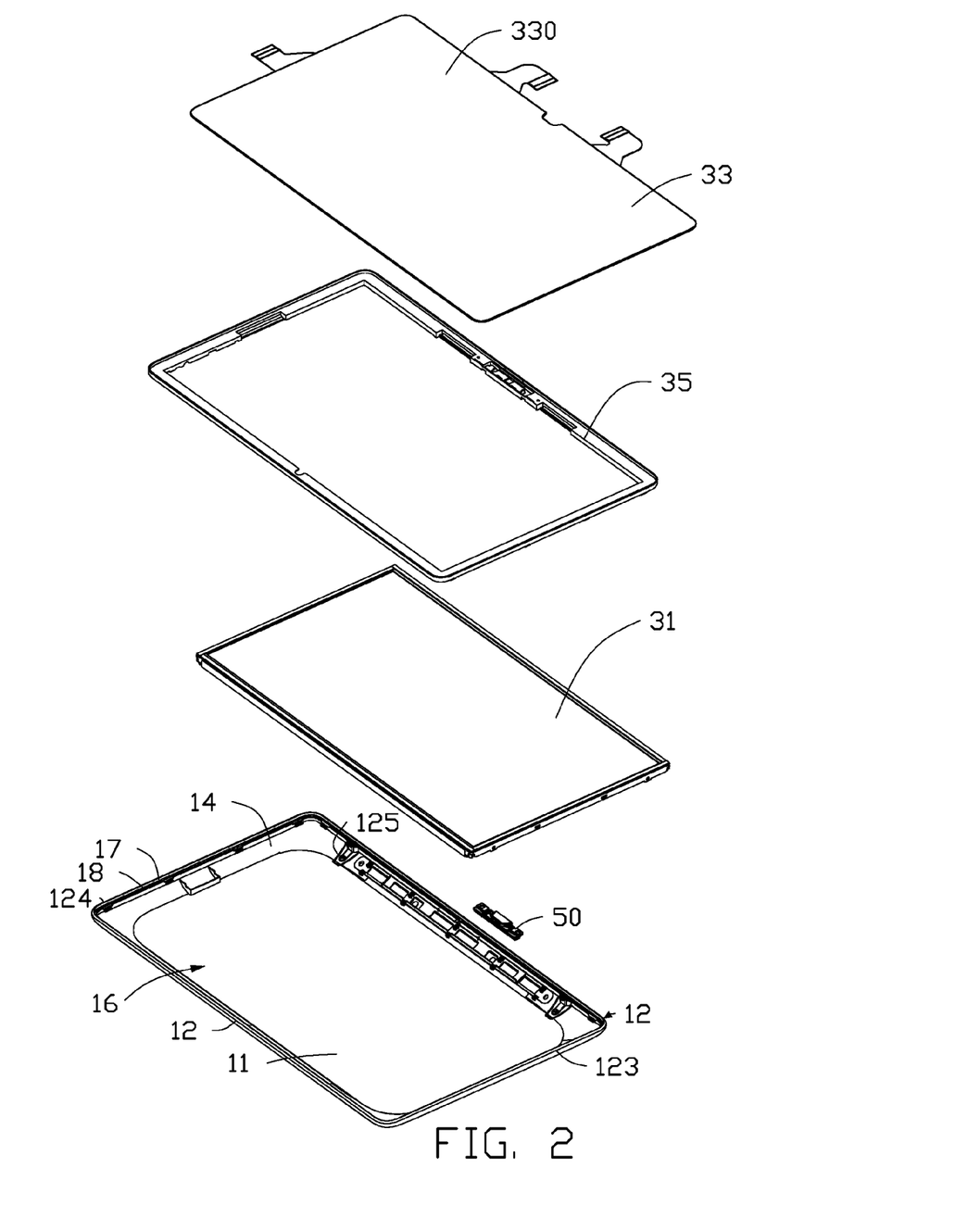
FIG. 2 is an exploded view of the electronic device of FIG. 1, including a display module, a key part, and an enclosure.
Figure 3:
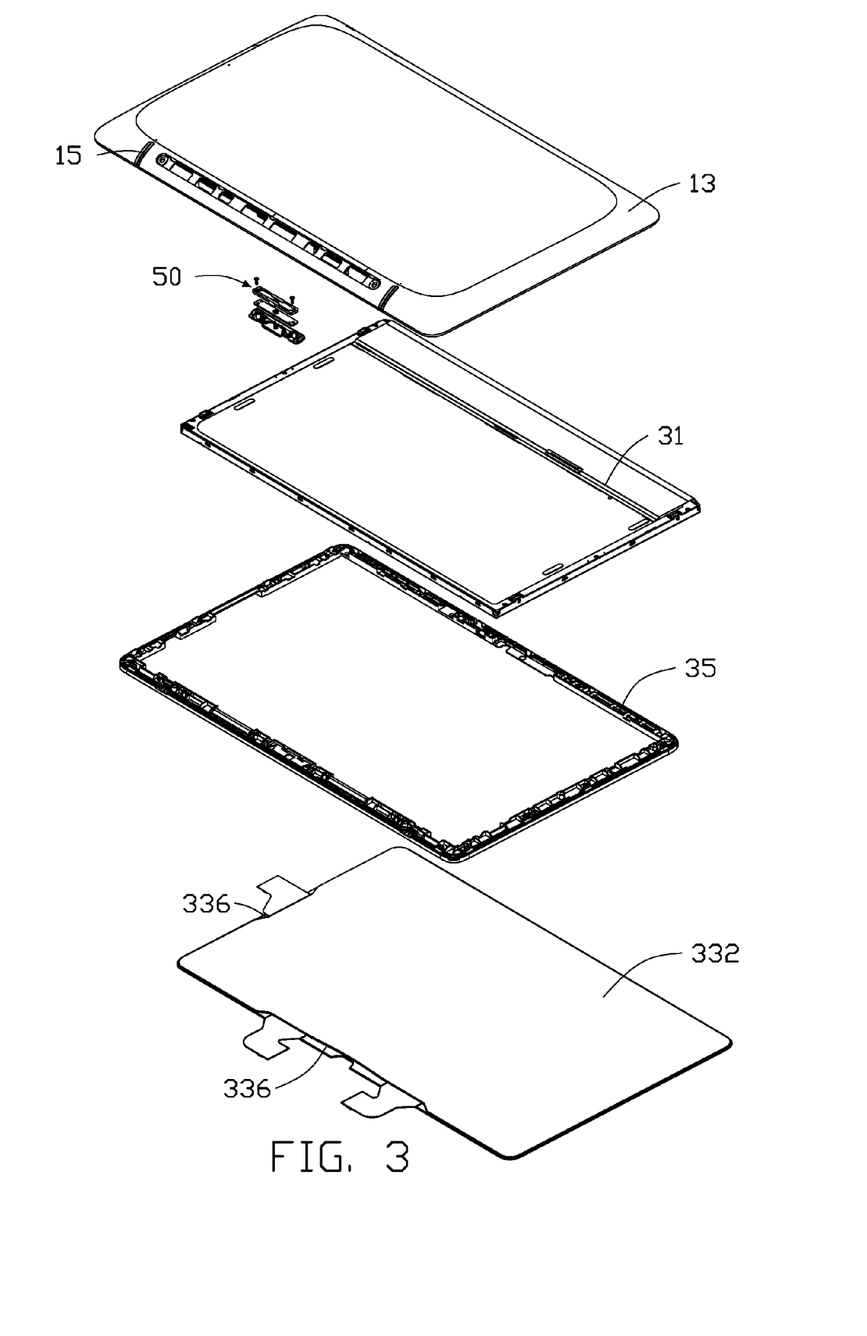
FIG. 3 is similar to FIG. 2, but viewed from another angle.

FIGS. 1-3 illustrate an electronic device 100 of the disclosure. The electronic device 100 includes an enclosure 10, a display module 30, a key part 50, and a waterproof structure. The enclosure 10 receives the display module 30, the key part 50, and the waterproof structure.

The enclosure 10 can include a bottom plate 11, four sidewalls 12, an external surface 13, an opposite internal surface 14, and two legs 15. The four sidewalls 12 include a first sidewall 121, a second sidewall 122, a third sidewall 123, and a fourth sidewall 124 extending from the bottom plate 11. The four sidewalls 12 and the bottom plate 11 form a receiving space 16. Two positioning holes 125 are defined in two opposite ends of the first sidewall 121. The two positioning holes 125 extend to the bottom plate 11 in the first sidewall 121. The two legs 15 respectively protrude out of the external surface 13 via the two positioning holes 125 to support the electronic device 100. The enclosure 10 can further include a limiting wall 17 surrounding the four sidewalls 12. The limiting wall 17 extends obliquely from the interface surface 14 to form a V-shaped receiving groove 18 with the four sidewalls 12.

Figure 4:
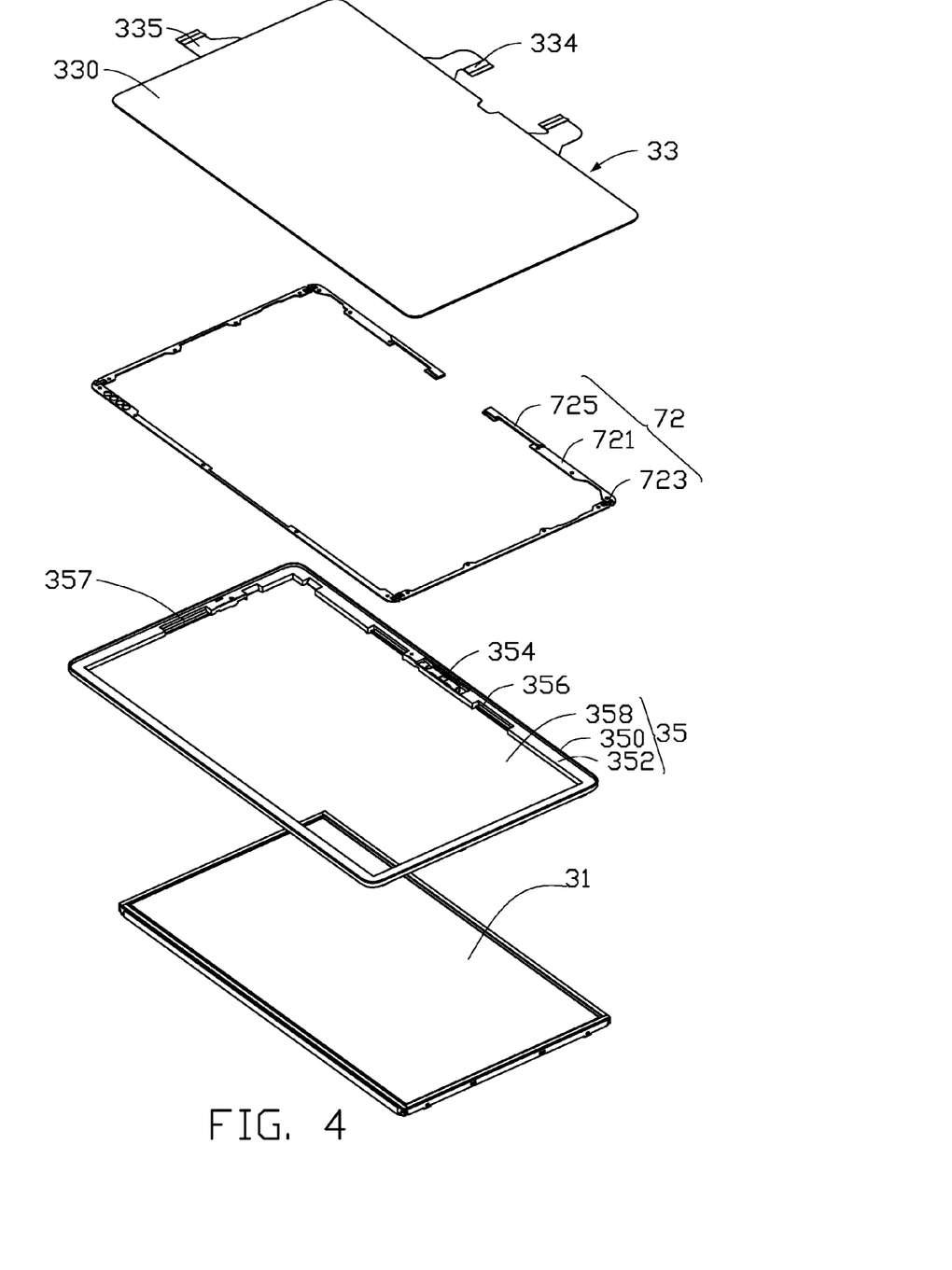
FIG. 4 is an exploded view of the display module of the electronic device of FIG. 2.

FIG. 4 illustrates that the display module 30 is received in the receiving space 16. The display module 30 can include a display 31, a touch panel 33, and a frame 35. The frame 35 is fixed to the four sidewalls 12. The frame 35 can include a fixing portion 350 and an extending portion 352 extending from the fixing portion 350. The extending portion 352 extends perpendicularly from the fixing portion 350. A cross-section of the frame 35 is T-shaped. The extending portion 352 defines an aperture 354, two first grooves 356, and a second groove 357. The aperture 354 is defined in a middle part of the extending portion 352 corresponding to the first sidewall 121. The two first grooves 356 are located at two sides of the aperture 354 in the extending portion 352. The second groove 357 is located at the extending portion 352 corresponding to the fourth sidewall 124. The extending portion 352 further includes a latching portion 358.

The display 31 is latched in the latching portion 358. The touch panel 33 is arranged on the display 31 facing a user of the electronic device 100. The touch panel 33 can include an upper surface 330, a lower surface 332, two first connection portions 334, and a second connection portion 335. Two fixing structure 336 are arranged in the lower surface 332. One fixing structure 336 is arranged at one side of the touch panel 33 corresponding to the first sidewall 121, and the other fixing structure 336 is arranged at the other side of the touch panel 33 corresponding to the fourth sidewall 124. The two first connection portions 334 correspond to the two first grooves 356. The second connection portion 335 corresponds to the second groove 357. In one embodiment, the first connection portion 334 is a flexible printed circuit (FPC). The two first connection portions 334 respectively pass through the two first grooves 356 to connect to the display 31. The second connection portion 335 connects to the display 31 via the second groove 357.

Figure 5:
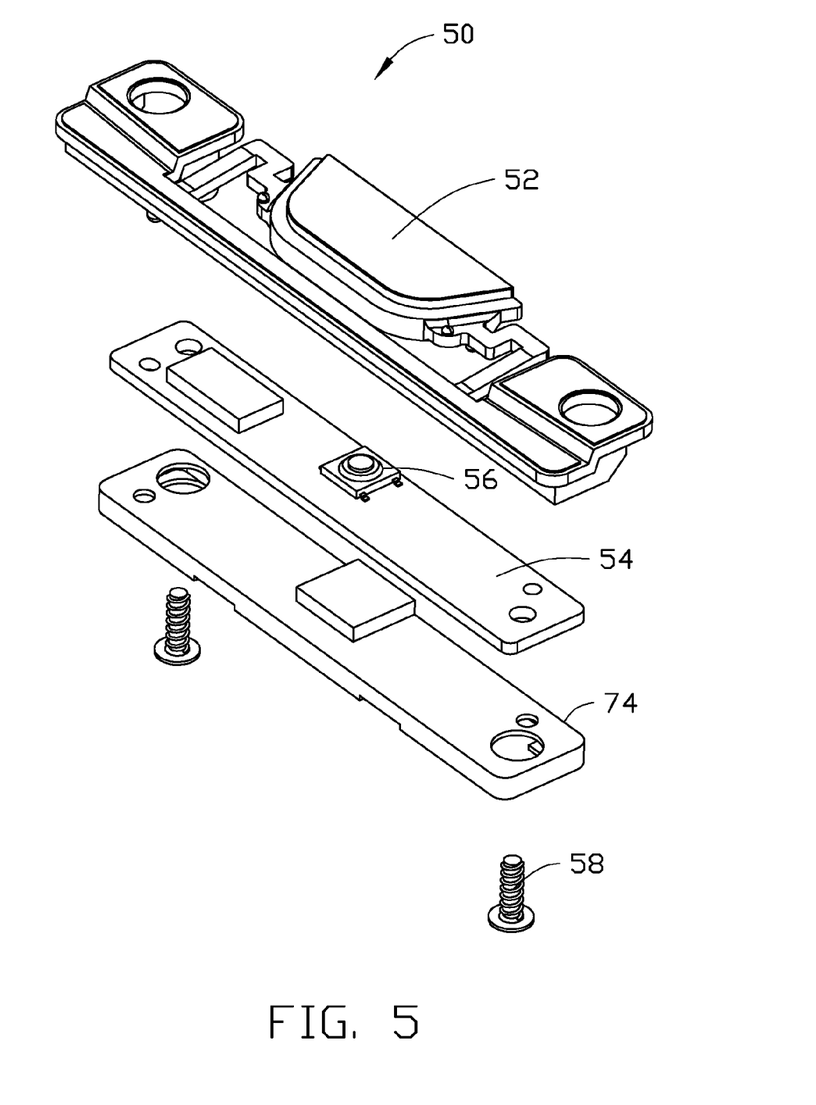
FIG. 5 is an exploded view of the key part of the electronic device of FIG. 2.
Figure 6:
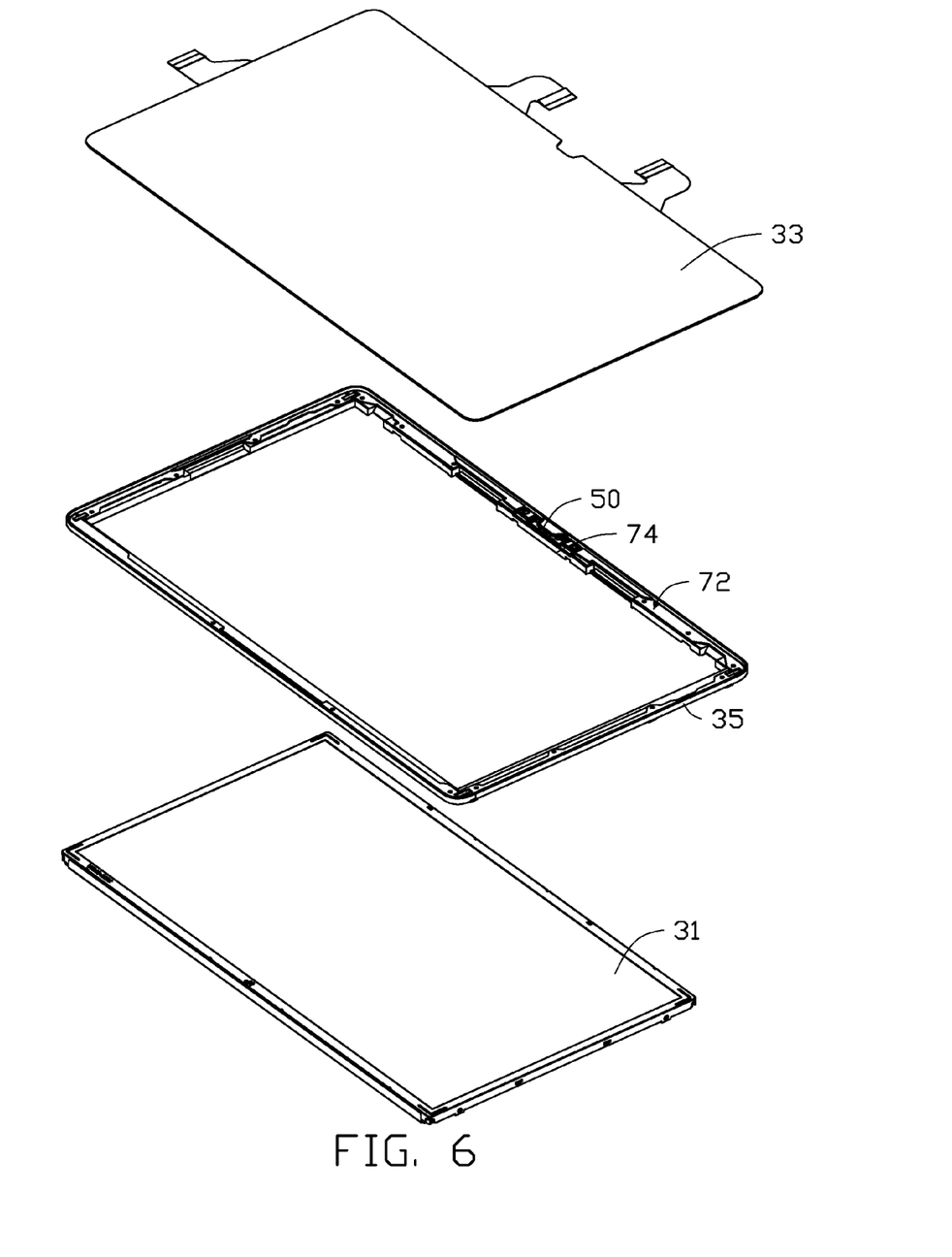
FIG. 6 is a partial assembled view of the electronic device of FIG. 2.

FIGS. 5-6 illustrates the key part 50 is arranged in the extending portion 352 between the two first connection portions 334. The key part 50 can include an operation portion 52, a circuit board 54, and a switch 56. The operation portion 52 is arranged on the extending portion 352 and protrudes out of the display module 30. The switch 56 is arranged on the circuit board 54 corresponding to the aperture 354.

FIGS. 4-7 illustrate that the water proof structure can include a first waterproof member 72, a second waterproof member 74, and a third waterproof member 76. The first waterproof member 72 is arranged between the touch panel 33 and the frame 35. The second waterproof member 74 protects the key part 50. The third waterproof member 76 is arranged between the frame 35 and the enclosure 10.

The first waterproof member 72 can include a plurality of waterproof tapes 721, four connection tapes 723, and a gasket 725. The plurality of waterproof tapes 721 is attached to the extending portion 352 to seal a gap between the lower surface 332 and the extending portion 352. The four connection tapes 723 are arranged in four corners of the extending portion 352 to seal gaps between each of the four corners of the extending portion 352 and the touch panel 33. The gasket 725 is attached to the waterproof tape 721 around the first groove 356 and the second groove 357 to seal gaps between the two first connection portions 334 and the extending portion 352. Thus, the touch panel 33 contacts closely with the frame 35 and gaps are sealed to prevent water from flowing into the electronic device 100.

The second waterproof member 74 is a box to seal the circuit board 54, the switch 56, and the operation portion 52. The second waterproof member 74 prevents the water from damaging the circuit board 54 and the switch 56. In the embodiment, the second waterproof member 74 is made of silicone.

Figure 7:
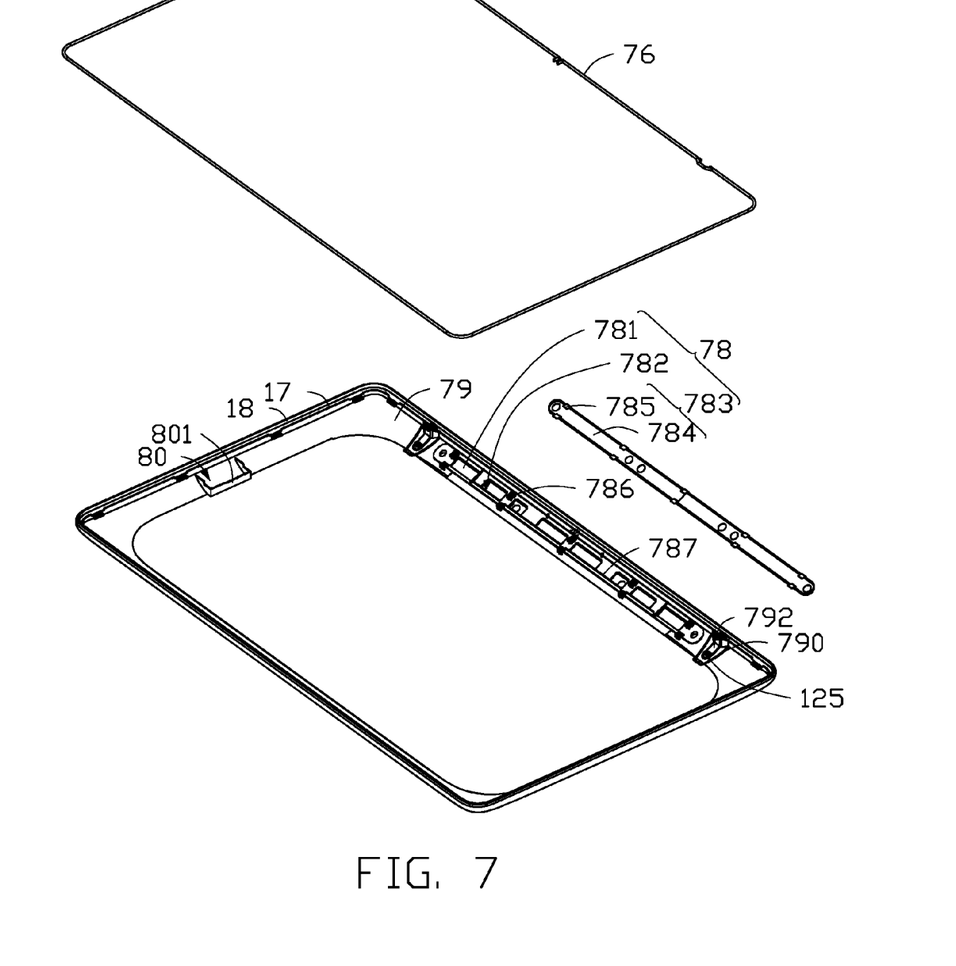
FIG. 7 is an exploded view of the enclosure of the electronic device of FIG. 2.

The third waterproof member 76 is received in the receiving groove 18. The third waterproof member 76 is a hollow pipe. When the frame 35 is assembled in the internal surface 14 of the enclosure 10, the third waterproof member 76 is received in the receiving groove 18 and sandwiched between the limiting wall 17 and the frame 35. When the water flows into the electronic device 100 via gaps between the fixing portion 350 and the enclosure 10, the third waterproof member 76 prevents water from further flowing into enclosure 10.

Figure 8:
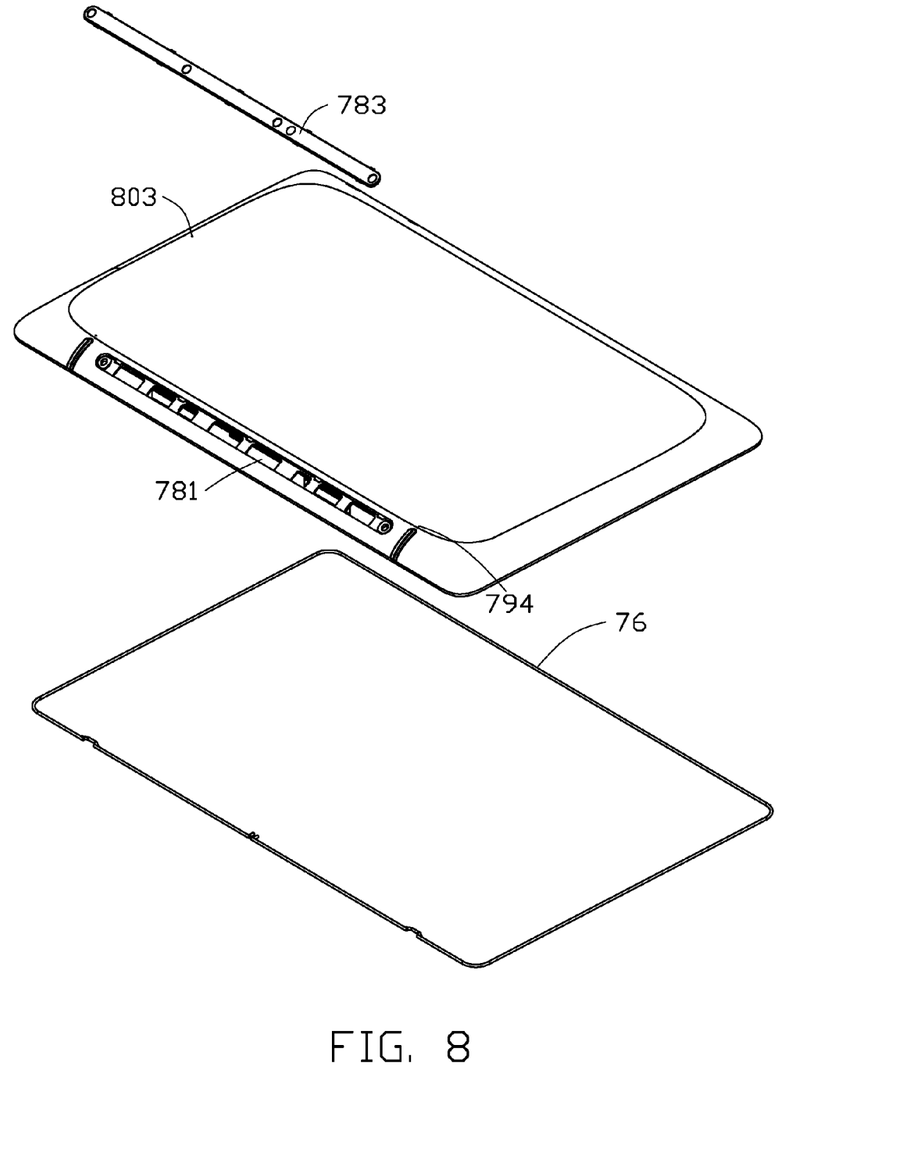
FIG. 8 is similar to FIG. 7, but viewed from another angle.
Figure 9:
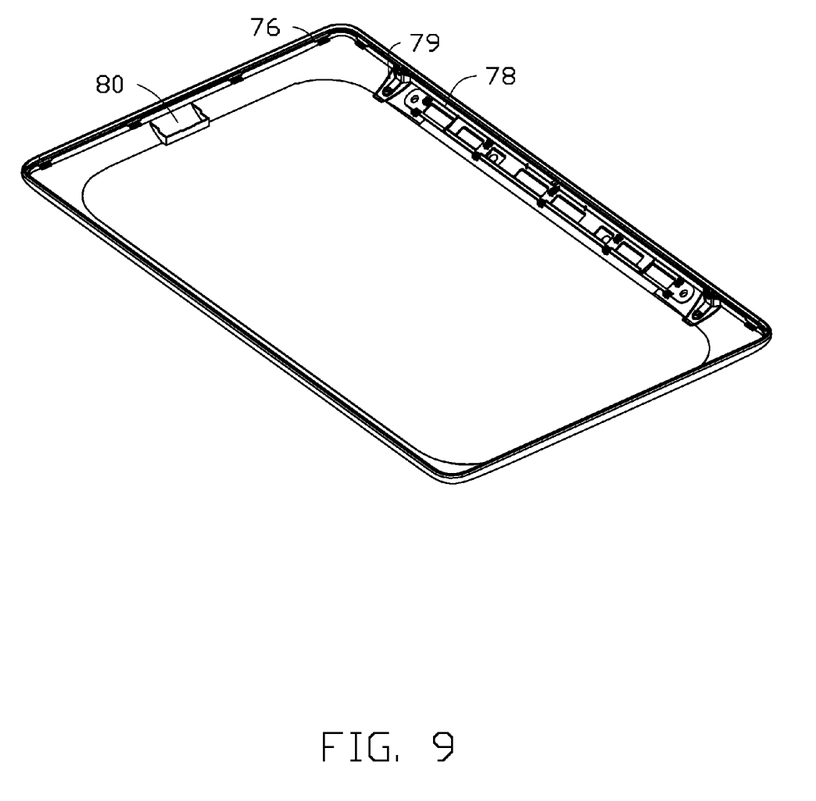
FIG. 9 is an assembled view of the enclosure of FIG. 7.

FIGS. 8 and 9 illustrate that the waterproof structure further includes a first draining device 78, two second draining devices 79, and a third draining device 80.

The first draining device 78 is arranged on the first sidewall 21 and can include a plurality of through holes 781, a first resisting member 782, and a water leakage portion 783. The plurality of through holes 781 are defined in the first sidewall 121. The first resisting member 782 is arranged on the first sidewall 121. The water leakage portion 783 is arranged on the external surface 13 of the enclosure 10. The water leakage portion 783 is a strip. The water leakage portion 783 can include a mesh body 784 and a plurality of latching portions 785 protruding from the mesh body 784. A plurality of mounting holes 786 are defined in the first sidewall 121 corresponding to the latching portions 785. When water flows into the electronic device 100 via gaps between the key part 50 and respective opposing sides of the gasket 725, the first resisting member 782 prevents the water from flowing into the electronic device 100 and then the water flows outside of the electronic device 100 via the through holes 781 and the water leakage portion 783.

The pair of second draining devices 79 correspond to the two legs 15. Each second draining device 79 can include a second resisting member 790, a guiding member 792, and a first water leakage hole 794. The second resisting member 790 is a rib protruding from the internal surface 14 around the guiding member 792. The guiding member 792 extends along the first sidewall 121 to the bottom plate 11. The first water leakage hole 794 is defined between the guiding member 792 and the second resisting member 790 at the bottom plate 11. When the water flows into the electronic device 100 via a gap between the enclosure 10 and the frame 35, the water can flow outside of the electronic device 100 via the guiding member 792 and the first water leakage hole 794.

The third draining device 80 is arranged in the fourth sidewall 124. The third draining device 80 can include a third resisting member 801 and a second water leakage hole 803. The third resisting member 801 protrudes out of the internal surface 14. The second water leakage hole 803 is defined between the fourth sidewall 124 and the third resisting member 801. When the water flows into the electronic device 100 via a gap between the touch panel 33 and the frame 35, the water can flow outside of the electronic device 100 via the second water leakage hole 803.

It is to be understood that even though numerous characteristics and advantages of the present embodiments have been set forth in the foregoing description, with details of the structures and functions of the embodiments, the disclosure is illustrative only; and changes may be in detail, especially in the matters of arrangement of parts within the principles of the embodiments to the full extent indicated by the broad general meaning of the terms in which the appended claims are expressed.

What is claimed is:

1. An electronic device, comprising:
   an enclosure defining a receiving space to receive a display module, the enclosure comprising an external surface and an internal surface opposite to the external surface;
   the display module comprising a display, a touch panel, and a frame;
   a key part comprising a circuit board and a switch; and
   a water proof structure comprising:
      a C-shaped first water proof member sealing a first gap between the touch panel and the frame to prevent water from flowing into the electronic device, the C-shaped first water proof member and the key part are arranged on the frame, the key part positioned in a second gap of the C-shaped first water proof member; and
      a second water proof member sealing the circuit board and the switch to protect the circuit board and the switch, the second water proof member positioned between key part and the frame.

2. The electronic device of claim 1, wherein the first water proof member comprises a plurality of water proof tapes, four connection tapes, and a gasket, the water proof tapes are attached to the frame to seal the first gap between the frame and the touch panel, the four connection tapes are arranged in four corners of the frame to seal the first gap between the frame and the touch panel at each of the four corners, and the gasket is attached to the water proof tapes around a groove defined in the frame.

3. The electronic device of claim 1, wherein the second water proof member is a box to seal the circuit board and the switch.

4. The electronic device of claim 1, wherein the water proof structure further comprises a third water proof member, wherein the third water proof member is a hollow pipe sandwiched between the enclosure and the frame.

5. The electronic device of claim 1, wherein the water proof structure further comprises a first draining device arranged at a sidewall of the enclosure, and the first draining device comprises a plurality of through holes, a first resisting member, and a water leakage portion; when the water flows into the electronic device via the second gap of the C-shaped first water proof member, portions of the second gap being between the key part and opposing ends of the gasket, the first resisting member prevents the water from flowing into the electronic device and enables the water to flow outside of the electronic device via the through holes and the water leakage portion.

6. The electronic device of claim 1, wherein the water proof structure further comprises two second draining devices comprising a second resisting member, a guiding member, and a first water leakage hole defined in the enclosure; when the water flows into the electronic device via a third gap between the enclosure and the frame, the water flows outside of the electronic device via the guiding member and the first water leakage hole.

7. The electronic device of claim 1, wherein the water proof structure further comprises a third draining device comprising a third resisting member and a second water leakage hole defined in the enclosure, when the water flows into the electronic device via the first gap between the touch panel and the frame, the water flows outside of the electronic device via the second water leakage hole.

8. An electronic device, comprising:
   an enclosure defining a receiving space to receive a display module;
   a key part located in the periphery of the receiving space; and
   a water proof structure comprises:
      a first water proof member sealing a first gap between the display module and the enclosure to prevent water from flowing into the electronic device; and
      a second water proof member sealing a second gap between the display module and the key part to prevent water from damaging the key part; and
      at least one draining device draining water to an outside of the enclosure.

9. The electronic device of claim 8, wherein the enclosure comprises an external surface and an internal surface opposite to the external surface, the enclosure further comprises a bottom plate, four sidewalls extending from the bottom plate, and two legs, and the four sidewalls and the bottom plate form a receiving space, the two legs protrude out of the external surface to support the electronic device, the enclosure further comprises a limiting wall around the four sidewalls, the limiting wall extends obliquely from the interface surface, and a V-shaped receiving groove is formed by the limiting wall and the four sidewalls.

10. The electronic device of claim 9, wherein the display module comprises a display, a touch panel, and a frame, and the frame is fixed on the four sidewalls and comprises a fixing portion and an extending portion extending from the fixing portion.

11. The electronic device of claim 10, wherein the key part comprises an operation portion, a circuit board and a switch, the operation portion is arranged on the extending portion to protrude out of the display module, and the switch is arranged on the circuit board.

12. The electronic device of claim 11, wherein the water proof structure further comprises a third water proof member comprising a plurality of water proof tapes, four connection tapes, and a gasket, the water proof tapes are attached to the extending portion to seal a third gap between the extending portion and the touch panel, the four connection tapes are arranged in four corners of the extending portion to seal the third gap between the extending portion and the touch panel at each of the four corners, and the gasket is attached to the water proof tape around a groove defined in the frame.

13. The electronic device of claim 11, wherein the second water proof member sealing the circuit board, the switch, and the operation portion, the second water proof member to protect circuit board and the switch.

14. The electronic device of claim 11, wherein the first water proof member is assembled in the internal surface of the enclosure and sandwiched between the limiting wall and the frame.

15. The electronic device of claim 12, wherein the at least one draining device comprises a first draining device arranged on a sidewall of the enclosure, and the first draining device comprises a plurality of through holes, a first resisting member, and a water leakage portion; and when the water flows into the electronic device via a third gap between the key part and opposing ends of the gasket of the third water proof member, the first resisting member prevents the water from flowing into the electronic device and further allows the water to flow outside of the electronic device via the through holes and the water leakage portion.

16. The electronic device of claim 11, wherein the first gap is between the enclosure and the frame of the display module, and wherein at least one draining device comprises two second draining devices comprising a second resisting member, a guiding member, and a first water leakage hole defined in the enclosure, and when the water flows into the electronic device via the first gap between the enclosure and the frame, the water flows outside of the electronic device via the guiding member and the first water leakage hole.

17. The electronic device of claim 11, wherein at least one draining device comprises a third draining device comprising a third resisting member and a second water leakage hole defined in the enclosure, when the water flows into the electronic device via a fourth gap between the touch panel and the frame, the water flows outside of the electronic device via the second water leakage hole.

* * * * *